US008813177B2

(12) United States Patent
Srour et al.

(10) Patent No.: US 8,813,177 B2
(45) Date of Patent: Aug. 19, 2014

(54) BACKGROUND APPLICATION MANAGEMENT

(75) Inventors: Benjamin S. Srour, Seattle, WA (US); Jesse Clay Satterfield, Seattle, WA (US); Jeffrey J. Johnson, Bellevue, WA (US); Ryan A Haveson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/547,957

(22) Filed: Jul. 12, 2012

(65) Prior Publication Data

US 2014/0020085 A1 Jan. 16, 2014

(51) Int. Cl.
*G06F 21/00* (2013.01)
(52) U.S. Cl.
USPC .................................................. 726/1; 726/26
(58) Field of Classification Search
USPC ............................................................. 726/1
See application file for complete search history.

(56) References Cited

U.S. PATENT DOCUMENTS

| 5,542,088 A * | 7/1996 | Jennings et al. ............. 718/103 |
| 7,231,198 B2 | 6/2007 | Loughran |
| 2005/0108075 A1 * | 5/2005 | Douglis et al. .................... 705/8 |
| 2007/0282959 A1 | 12/2007 | Stern |
| 2009/0180412 A1 | 7/2009 | Albert et al. |
| 2010/0083255 A1 | 4/2010 | Bane et al. |
| 2010/0274507 A1 | 10/2010 | Black et al. |
| 2011/0131321 A1 | 6/2011 | Black et al. |
| 2011/0296418 A1 * | 12/2011 | Kim et al. ....................... 718/100 |
| 2012/0023190 A1 | 1/2012 | Backholm et al. |
| 2012/0260118 A1 * | 10/2012 | Jiang et al. ..................... 713/340 |

OTHER PUBLICATIONS

Reestman, "Background Apps: They're Not Just for Push", accessible from http://gigaom.com/apple/background-apps-theyre-not-just-for-push/, published Mar. 17, 2009, 11 pages.
Rodriguez, "Running a Windows Phone Application under the Lock Screen", available from http://blogs.msdn.com/b/jaimer/archive/2010/11/01/running-a-windows-phone-application-under-the-lock-screen.aspx, published Nov. 1, 2010, 3 pages.

* cited by examiner

*Primary Examiner* — Yogesh Paliwal
(74) *Attorney, Agent, or Firm* — Carole Boelitz; Micky Minhas; Lee & Hayes PLLC (57) ABSTRACT

The techniques and systems disclosed herein generally pertain to managing permissions for applications to allow the applications to run in a background state by an operating system. In some embodiments, user interfaces may be used to allow users to manage application permissions without requiring the user to understand specifics of background applications, but rather by providing a predetermined threshold number of permissions that the user can assign to applications. When the predetermined threshold number of permissions has been allocated and a subsequent application requests a permission, the user may replace or swap out an application that currently has a permission by giving the permission to the requesting application.

19 Claims, 7 Drawing Sheets

BACKGROUND APPLICATION MANAGEMENT

BACKGROUND

Modern computing devices provide a range of functionality that enables users to interact with the computing devices in many different ways and perform many different tasks. Computing devices can be used for entertainment (e.g., gaming, playing media, etc.), to run utility applications (e.g., word processing applications, database management applications, etc.), for communication (e.g., web browsers, calling applications, etc.), and for other purposes. When a computing device is executing an application for a user, the user experience is typically focused on obtaining visual feedback in the way of an event, data, or other content. However, some applications may run in a background state and not be visible to the user. These are called background applications. Management of background applications has direct implications on use of battery power and processing performance of computing devices. In some situations, computing devices may not allow use of background application in order to save battery power or for other reasons.

However, some applications may be helpful to users and warrant the ability to execute code in the background. Some platforms have taken a very constrained model that puts the onus on manual testing by an administrator to decide which applications are allowed to run in the background. Thus, these platforms decide for the user which applications are allowed to run in the background, and do not solicit user input. For example, Voice over Internet Protocol (VoIP) applications often attempt to maintain a connection to a VoIP server to be able to receive a signal about an incoming phone call. Creating objective criteria that does not fall under scrutiny can be a challenge for administrators. Other platforms have taken the opposite approach and do not decide which applications are allowed to run in the background. This hands-off approach may allow developers to inundate a device with background applications, which may severely impact battery life and processing performance of the computing device.

The reality is that most applications for modern computing devices do not need to run in the background. However, a class of applications exists that often do need some ability to run code in the background. These applications are typically in the real-time communications category such as electronic mail (email), VoIP and instant messaging. The back end servers which power these servers often desire immediate guaranteed delivery of notifications to their clients. Push notifications may be used, but there are no delivery guarantees for the notifications and there is no encryption or privacy. Given the privacy and latency concerns, many customers and application services may prefer to have a direct connection to their servers in the background to notify users when something happens.

SUMMARY

The techniques and systems disclosed herein generally pertain to managing permissions for applications to allow the applications to run in a background state by an operating system. In some embodiments, user interfaces may be used to allow users to manage application permissions without requiring the user to understand specifics of background applications, but rather by providing a predetermined threshold number of permissions that the user can assign to applications. When the predetermined threshold number of permissions has been allocated and a subsequent application requests a permission, the user may replace or swap out an application that currently has a permission by transferring the permission to the requesting application.

In various embodiments, a background application manager may receive a request for an application to run in a background state. The background application manager may determine whether a permission is available for allocation to the application. When the permission is available, the background application manager may permit the application to run in the background state following receipt of a user approval of the request. When the permission is not available, the background application manager may provide a user an option to reassign an issued permission that was granted to another application, the option enabling receipt of the user approval of the request. The background application manager may prevent the application from running in the background state after receipt of a user rejection of the request This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The techniques and systems disclosed herein generally pertain to managing permissions for applications to allow the applications to run in a background state by an operating system. As discussed above, some applications may be helpful to users and warrant that ability to execute code in the background. However, without management of permissions, too many applications may be allowed to run in the background, which may ultimately negatively impact processing performance and battery performance of a computing device. Thus, a limit to the number of background applications may protect battery life and/or reduce undesirable degradations in processing performance.

In some embodiments, user interfaces may be used to allow users to manage application permissions without requiring the user to understand specifics of background applications, but rather by providing a predetermined threshold number of permissions that the user can assign to applications. For example, a newly installed application may request a permission to run in the background from the user. The user can decide to allow this activity by allocating a permission for the application or by rejecting the request. When the predetermined threshold number of permissions has been allocated and a subsequent application requests a permission, the user may replace or swap out an application that currently has a permission by giving the permission to the requesting application.

In various embodiments, the applications having the permissions may be represented on a lock screen or other dedicated interface using badges (e.g., pictures, symbols, icons, etc.). The badges may provide information to the user, such as a number of missed messages, conversations, missed calls, posts, or other data.

The techniques and systems described herein may be implemented in a number of ways. Example implementations are provided below with reference to the following figures.

Illustrative Environment

Figure 1:
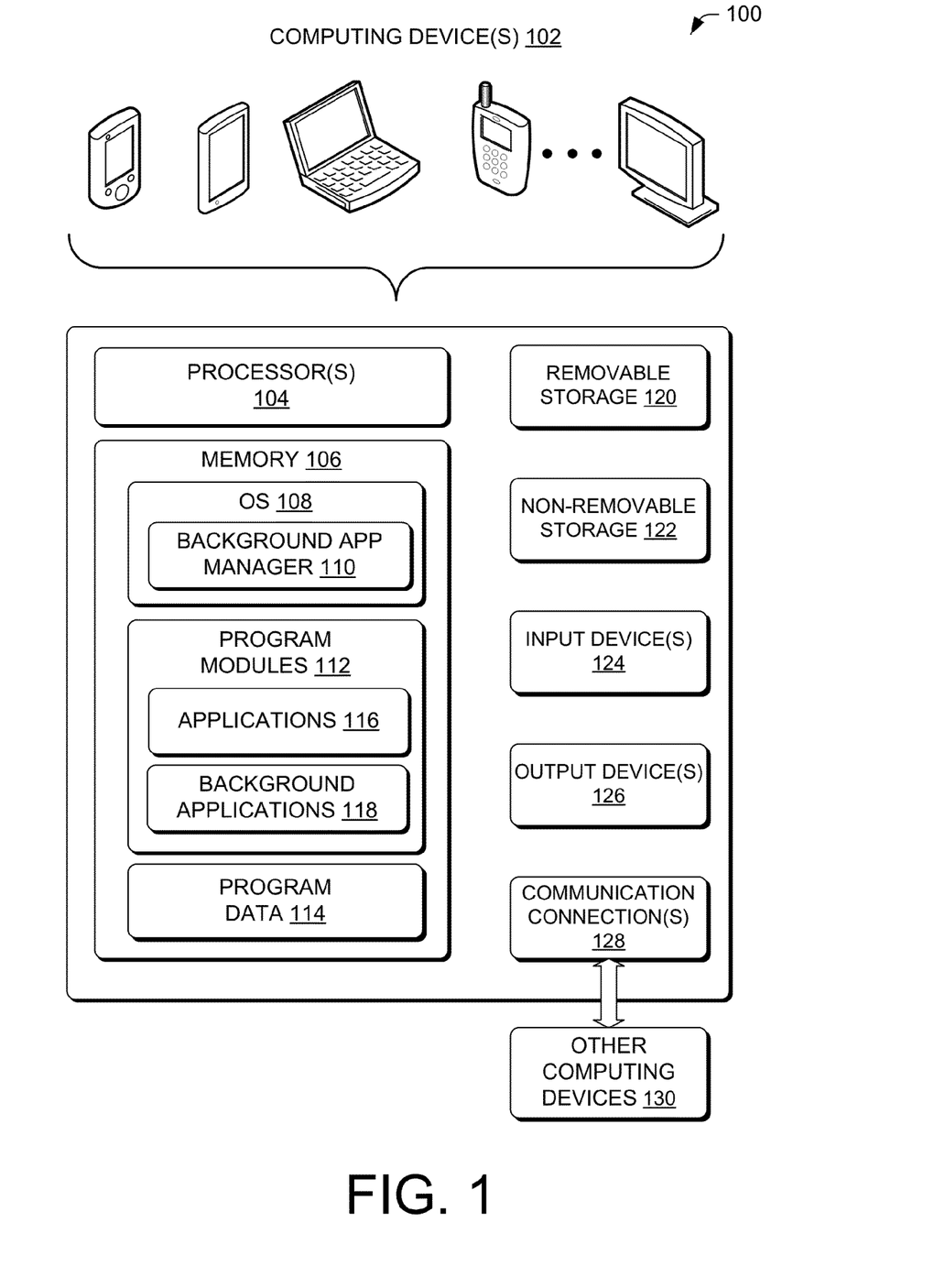
FIG. 1 is a schematic diagram of an illustrative computing architecture that provides management of background applications.

FIG. 1 is a schematic diagram of an illustrative computing architecture 100 that provides management of background applications. The computing architecture 100 may be implemented by a computing device 102. The computing device 102 may be laptop computer, a desktop computer, a tablet, a mobile computer, a netbook, a mobile telephone, a gaming console, a music player, a set top box, or one of other possible client devices. The computing device 102 shown in FIG. 1 is only one example of a computing device and is not intended to suggest any limitation as to the scope of use or functionality of the computer architectures. The computing device 102 is not intended to be interpreted as having any dependency or requirement relating to any one or combination of components illustrated in the example computing device.

The computing device 102 may include one or more processor(s) 104 and memory 106. Depending on the exact configuration and type of computing device, the memory 106 may be volatile (such as RAM), non-volatile (such as ROM, flash memory, etc.) or some combination of the two. The memory 106 may be used to store instructions that, when executed by the processor(s) 104, cause the processor(s) to perform at least a portion of the processes described herein. The instructions may be stored in the memory 106 in the form of various components, modules, or other types of instructions that facilitate the processes described herein.

In accordance with some embodiments, the memory 106 may be used to store an operating system 108. The operating system 108 may further store a background application manager 110 that manages permissions to allow and restrict applications from operating in a background state, as further discussed below. However, in some embodiments, the background application manager 110 may be a separate application from the operating system 108. In addition, the memory 106 may include one or more program modules 112, and may include program data 114. The program modules 112 may include applications 116 and background applications 118, which may be distinguishable based at least in part by permissions issued by the background application manager 110. In some embodiments, the permissions may be at least partially stored on a remote server (e.g., cloud computing service, etc.). Thus, some or all of the data may be stored remotely.

The computing device 102 may have additional features or functionality. For example, the computing device 102 may also include additional data storage devices (removable and/or non-removable) such as, for example, magnetic disks, optical disks, flash memory, organic memory, and/or tape. Such additional storage is illustrated in FIG. 1 by removable storage 120 and non-removable storage 122, besides the memory 106. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The memory 106, the removable storage 120 and the non-removable storage 122 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 104, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 102 may also have input device(s) 124 such as keyboard, mouse, pen, voice input device, touch input device, etc. Output device(s) 126 such as a display, speakers, printer, etc. may also be included. These devices are well known in the art and are not discussed at length here.

The computing device 102 may also contain communication connections 128 that allow the device to communicate with other computing devices 130, such as over a network. These networks may include wired networks as well as wireless networks. The communication connections 128 are one example of communication media.

It is appreciated that the illustrated computing device 102 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 102 may be implemented in a cloud computing environment, such that resources and/or services are made available via a computer network.

Figure 2:
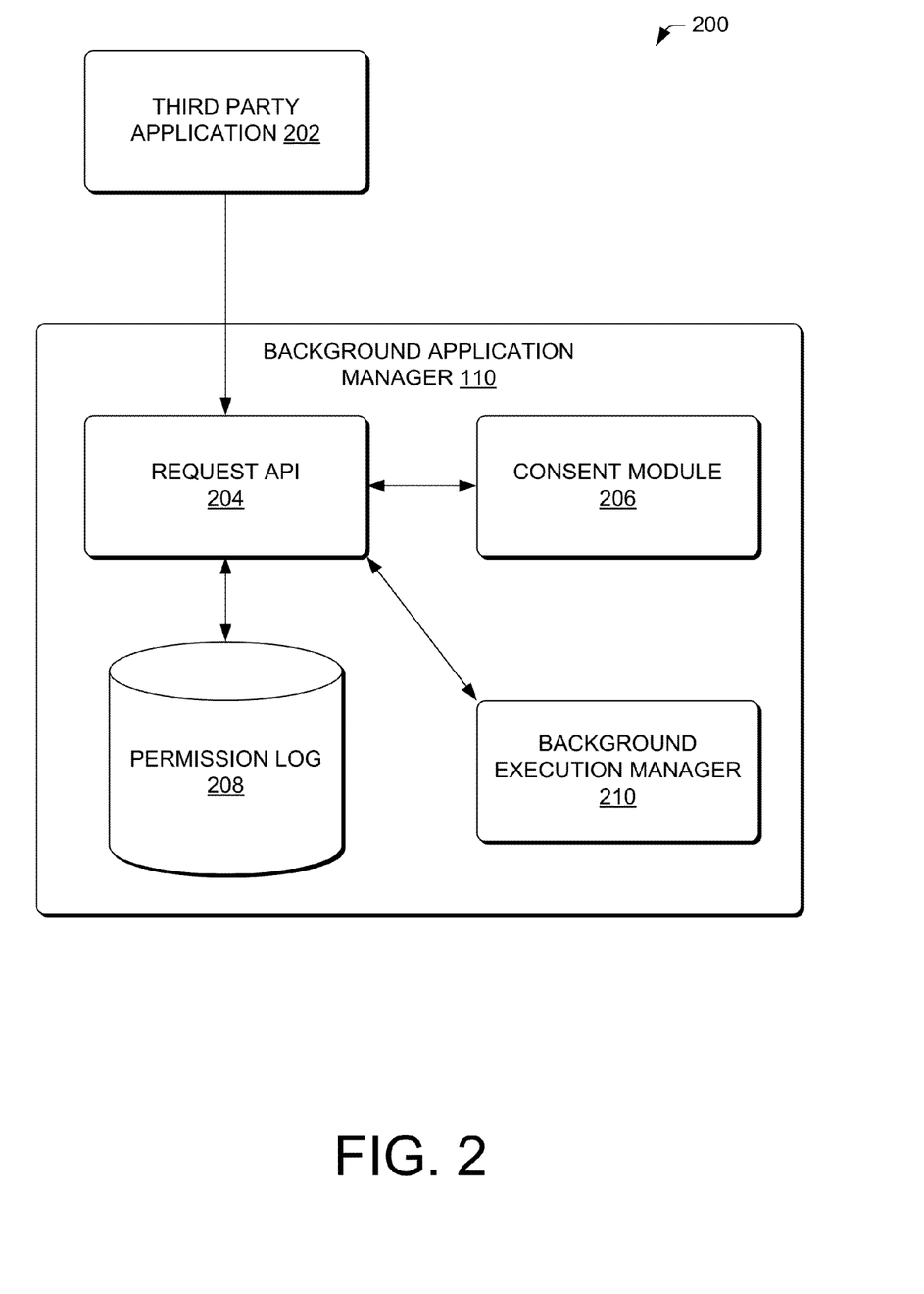
FIG. 2 is a block diagram of an illustrative background application manager that provides management of background applications.

FIG. 2 is a block diagram of the background application manager 110 in an environment 200. The environment may include a third party application 202, which may be installed on the computing device 102 using the operating system 108. The background application manager 110 may interact with the third party application 202 during or after installation through use of a request application program interface (API) 204. The request API 204 may communicate or interact with the third party application 202 when the third party application requests to run in background state. For example, a third party developer may create the third party application 202 to perform some activities in the background state that is not observable by a user of the computing device 102. The activities may include monitoring communications, attempting to access data via a network, or other tasks. For example, the third party application 202 may be a voice-over internet protocol (VoIP) application that may run in the background state in order to receive requests from other users (i.e., callers). As another example, the third party application 202 may be a messaging application, such as an electronic mail application, an instant messaging application, or another type of messaging application that may run in the background state in order to receive communications (e.g., messages, emails, chats, etc.) from other users and indicate, after receipt, an availability of messages or other associated information. The third party application 202 may also be a utility program that performs maintenance tasks for the computing device 102, a media application, or other types of applications that may request an ability to operate in the background state.

The request API 204 may receive a request from the third party application 202. For example, during or after installation of an application, the request API 204 may determine whether the third party application 202 requests the ability to run in the background state. When the third party application 202 requests the ability to run in the background state, then the background application manage 110 may provide an authorization process via a consent module 206. The consent module 206 may enable a user to select whether or not to allow the third party application 202 to run in the background state. The consent module 206 may provide a structured process to allow the user to allow or deny a request by the third party application 202 for the ability to run in the background state. In some embodiments, the consent module 206 may enforce a predetermined limit or threshold number of applications that are permitted to run in the background state. Thus, the consent module 206 may indicate to the user that a limited number of applications are allowed to obtain the permission (ability) to run in the background state, which may be communicated to the user in a graphical user interface (UI) without expressly discussing the background state, computing resources, or other technical language that may be unfamiliar to a novice or intermediate user.

When the user provides the permission, via the consent module 206, to allow the third party application 202 to run in the background state, then the request API 204 may log the third party application 202 in a permission log 208. The permission log 208 may be restricted to the threshold number of applications that have permission to operate or run in the background state. The entries in the permission log 208 may be modified or deleted over time while being limited to the threshold number of applications.

A background execution manager 210 may enforce the permissions in the permission log 208, via operation with the request API 204. The background execution manager 210 may be used by a layer of the system responsible for executing background tasks. The background execution manager 210 may determine through the request API 204 that an application has the permission to run in the background state, which is indicated when the application is included in the permission log 208.

In accordance with some embodiments, the third party application 202 may be limited to requesting the permission to the request API 204 to run in the background state to a threshold number of requests. The threshold number of requests may be set to a single occurrence in some implementations to prevent the application to continually asking the user for permission and thus pestering the user or otherwise being a nuisance. The request API 204 may track the requests from the applications and may prevent subsequent requests when the threshold number has been reached or exceeded.

Returning to FIG. 1, the background applications 118 may be applications that have received the permission via the request API 204 and are included in the permission log 208. The applications 116 may be applications that are not included in the permissions log 208.

Illustrative Operations

Figure 3:
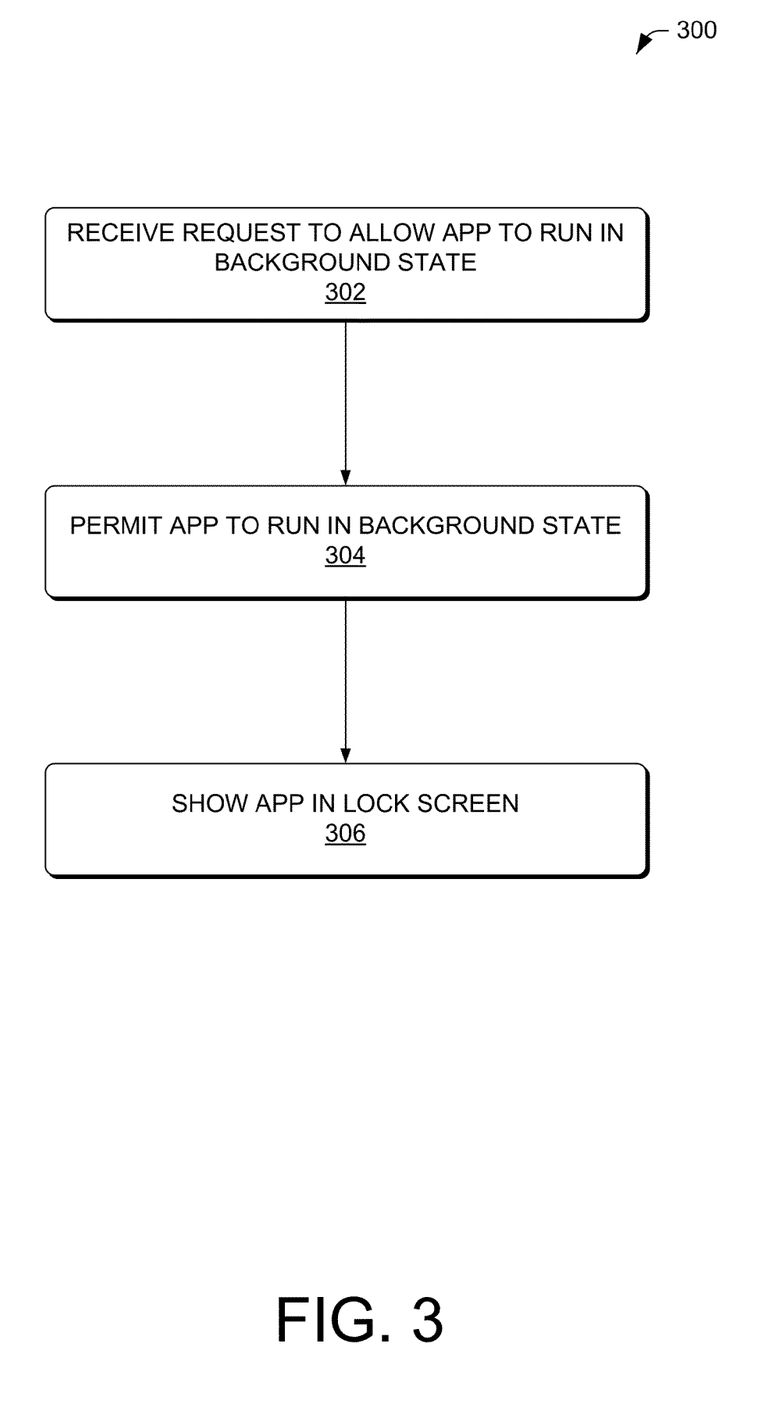
FIG. 3 is a flow diagram of an illustrative process of managing permissions of background applications using a lock screen.
Figure 4:
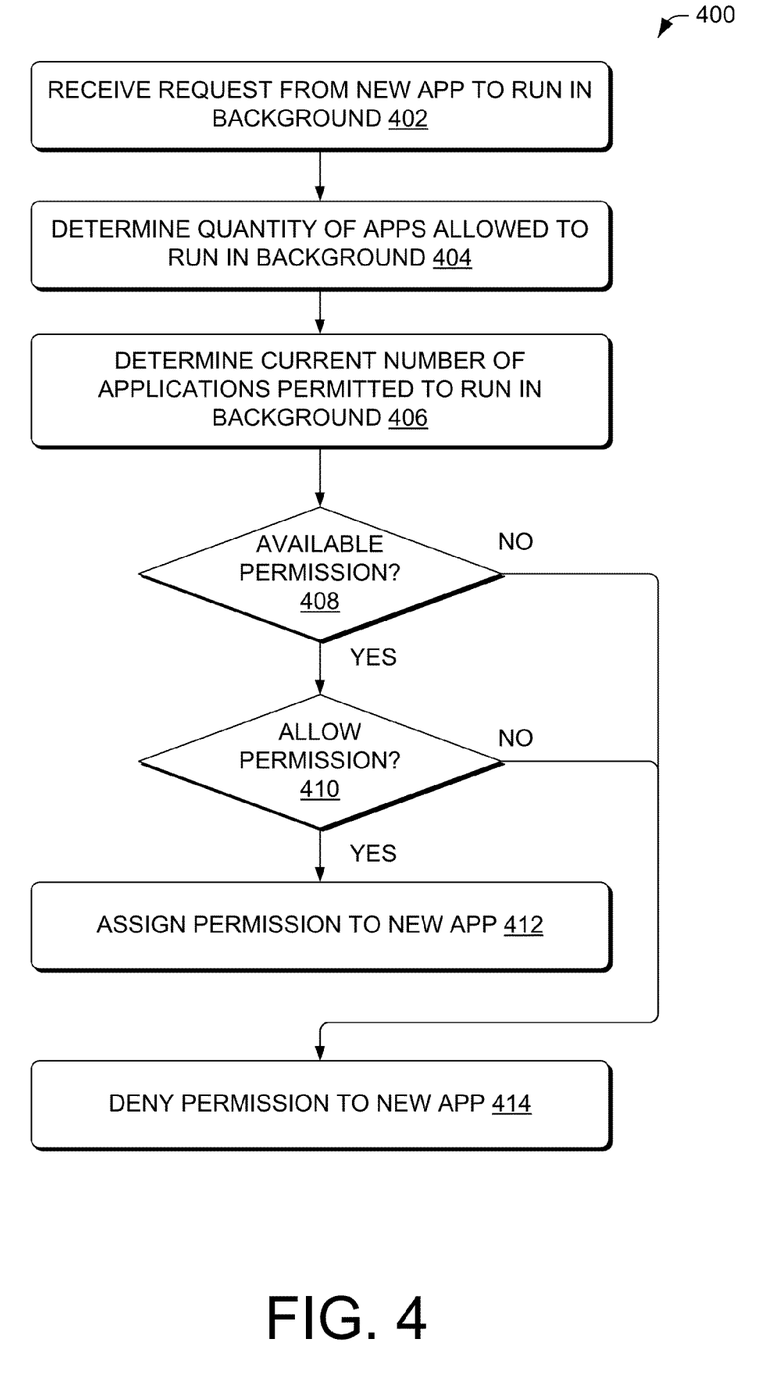
FIG. 4 is a flow diagram of an illustrative process of allocating permissions for background applications using a threshold quantity of permissions.
Figure 5:
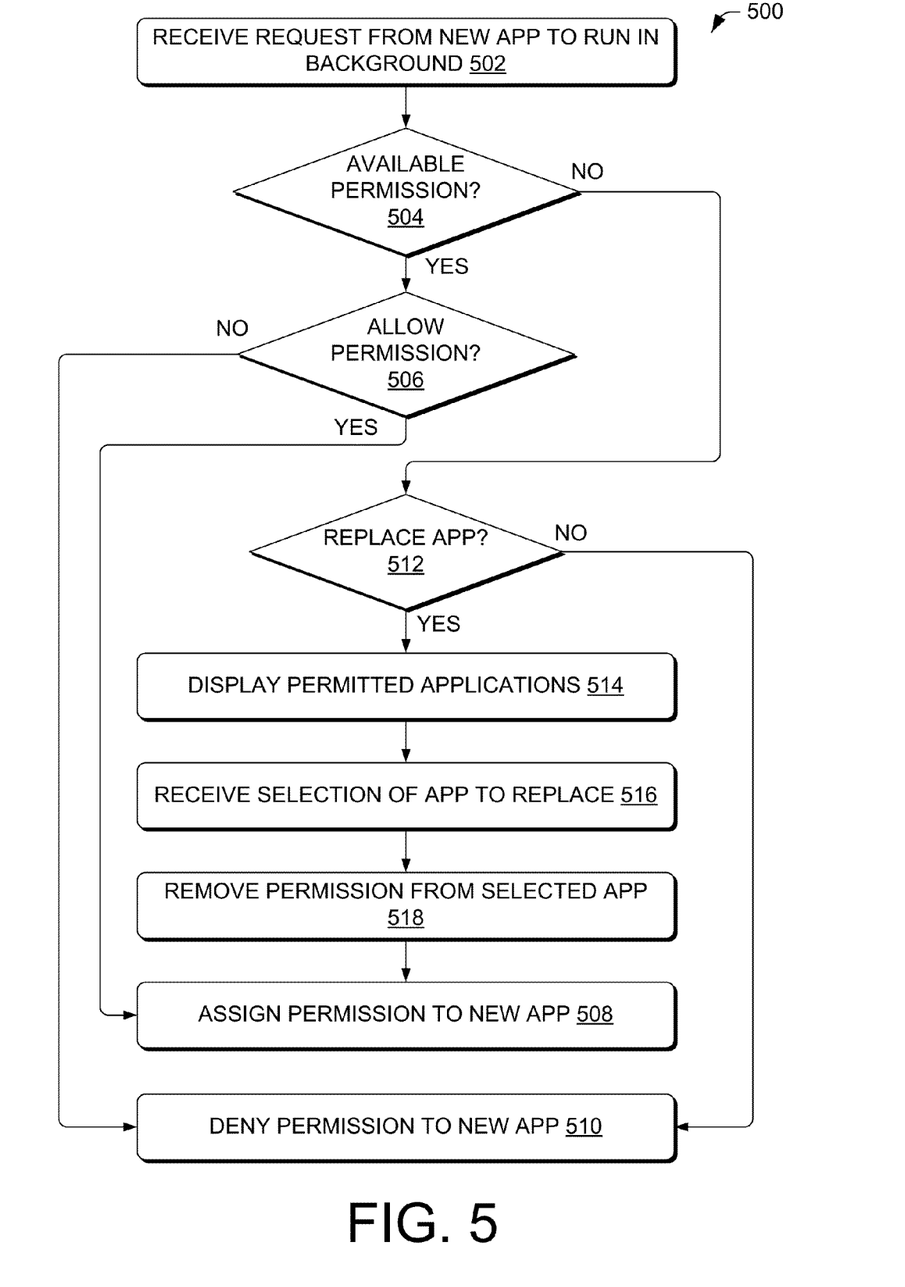
FIG. 5 is a flow diagram of an illustrative process of replacing a permission for an application when the threshold quantity of permissions has been reached or exceeded.

FIGS. 3-5 show illustrative processes of managing permissions of background applications. The processes are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 of managing permissions of background applications using a lock screen. The process 300 may be performed by the background application manager 110 using components discussed with reference to FIG. 2.

At 302, the background application manager 110 may receive a request to allow an application to run in a background state. For example, the request API 204 may receive the request from the third party application 202. In some implementations, the request API 204 may initiate the request after determining that the third party application lacks permission to run in the background. When the third party application 202 does not have the permission and has not had more than a threshold number of requests, than the request API may generate a request at the operation 302.

At 304, the background application manager 110 may permit the third party application to run in the background state. For example, the background application manager 110 may provide a permission via the request API 204. The request API 204 may log the application in the permission log 208, which may then enable the third party application 202 to continue to run in the background without a subsequent authorization or permission, unless the permission is revoked, as discussed below.

At 306, the background application manager 110 may present the application in a lock screen or other dedicated screen or user interface (UI). The lock screen or other dedicated screen or UI may be used to inform a user of any activities of the background application, to control inventory of permissions for the background applications, and/or for other purposes. The lock screen may be a screen, presentation, mode, or other electronic space provided by the operating system 108 and that may communicate information about the background applications as well as other user content, such as a time/date, background image, instructions to use the device, and/or other data.

FIG. 4 is a flow diagram of an illustrative process 400 of allocating permissions for background applications using a threshold quantity of permissions. The process 400 may be performed by the background application manager 110 using components discussed with reference to FIG. 2.

At 402, the background application manager 110 may receive a request to allow an application to run in a background state. The operation 402 may be performed in a same or similar manner as the operation 302 of the process 300.

At 404, the background application manager 110 may determine a quantity of applications allowed to run in the background state. For example, the request API 204 may limit a number of applications that are allowed to run in the background state to a predetermined threshold amount. The predetermined threshold amount may be set by a developer, a system administrator, a user, and/or another party or entity. The predetermined threshold amount may correspond to a plurality of permissions that may be allocated to corresponding applications. In some embodiments, the limit may be generated as a function of available battery life.

At 406, the background application manager 110 may determine a current number of the applications permitted to run in the background state. For example, the request API 204 may determine that the computing device 102 currently has x number of the predetermined threshold number of permissions already assigned to other applications. The predetermined threshold number of permissions may be set by an administrator, a developer, or other entity or party. In some embodiments, the predetermined threshold number may be set or determined based at least in part on user input. For example, the user may select from a number of values, each providing an associated performance impact warning (e.g., 5 permissions→"You may experience moderate performance reduction", 10 permissions→"you may experience significant performance reduction", etc.). In various embodiments, the predetermined threshold number is fixed and cannot be modified by the user.

At 408, the background application manager 110 may determine whether a permission is available to assign to a requesting application based at least in part on the data from the operations 404 and 406. When additional permissions are available, then the process 400 may proceed to a decision operation 410.

At 410, the background application manager 110 may determine whether to allow the permission, which may be based on input received by the background application manager 110 via the consent module 206. For example, the user may receive a message asking whether the user desires to allow the application to run continuously or having another similar type of question related to an ability for the application to run in the background state. When the background application manager 110 receives approval (following the "yes" route), then the background application manager 110 may assign a permission to the new application at 412.

When the background application manager 110 receives a denial (following the "no" route from the decision operation 410) or when the permissions are not available (following the "no" route from the decision operation 408), then the background application manager 110 may deny the permission to the new application at 414. However, even after a denial, the application may still be executed in a foreground state and thus is visible to the user during execution.

FIG. 5 is a flow diagram of an illustrative process 500 of replacing a permission for an application when the threshold quantity of permissions has been reached or exceeded. The process 500 may modify the "no" route of the decision operation 408 to enable a user to reassign a permission. Thus, once the permissions have been allocated, then a user may not issue additional permissions, but instead may reassign a permission from one application to another application.

At 502, the background application manager 110 may receive a request to allow an application to run in a background state. The operation 502 may be performed in a same or similar manner as the operation 302 of the process 300.

At 504, the background application manager 110 may determine whether a permission is available. The decision operation 504 may be performed in a same or similar manner as the operation 408 of the process 400. When the permission is available at 504 (following the "yes" route), then the process may proceed to a decision operation 506.

At 506, the background application manager 110 may determine whether to allow the permission, which may be based on input received by the background application manager 110 via the consent module 206 as described above with reference to the decision operation 410. When the background application manager 110 receives approval (following the "yes" route), then the background application manager 110 may assign a permission to the new application at 508. When the background application manager 110 receives a denial (following the "no" route from the decision operation 506), then the background application manager 110 may deny the permission to the new application at 510.

When the permissions are not available (following the "no" route from the decision operation 504), then the background application manager 110 may proceed to a decision operation 512. At 512, the background application manager 110 may determine whether to replace an application (i.e., reallocate a permission). For example, when the request API 204 is limited to a threshold number of permissions and the permission log 208 has assignments for all of the permissions, then the process 500 may allow a user to replace an application and/or reassign a permission assuming the user wants to assign a permission to the new application via the consent module 206. When the background application manager 110 determines to replace an application (following the "yes" route from the decision operation 512), then the process 500 may advance to an operation 514.

At 514, the background application manager 110 may present the permitted applications. For example, the background application manager 110 may present the applications that currently have the permission to run in the background state (i.e., the background applications 118) in a screen, such as a lock screen, a system control screen, or another UI that allows the user to receive information about operation of the operating system 108.

At 516, the background application manager 110 may receive a selection of an application to be replaced, and thus lose its permission to run in the background state. For example, the consent module 206 may provide a list of the applications currently having permissions based on data from the permission log 208. The consent module 206 may then request the user to select one of the applications from the list of applications having the permissions.

At 518, the background application manager 110 may remove a permission from the selected application that is selected at the operation 512.

At 506, the background application manager 110 may assign the permission to the new application (e.g., the third party application 202, etc.) that requests the ability to run in the background state via the operation 502.

In some embodiments, the operations 516, 518, and 506 may be performed using a replace process rather than a delete-then-assign process. For example, the replace process may simply modify the permissions log 208 to change the name of an application associated with a permission to a name of the new application. As an example, the permission log may include x number of permissions, and a log entry may be changes from {permission $x_n$, current application} to {permission $x_n$, new application}.

When the background application manager 110 determines not to replace an application (following the "no" route from the decision operation 512), then the process 500 may advance to the operation 510. At 510 the background application manager 110 may deny the permission to the new application. Thus, at 510, the request API 204 may prevent execution of the third party application 202 from being executed in the background state. The background execution manager 110 may enforce the denial of the request and/or otherwise prevent the third party application 202 from being executed in the background state. In some embodiments, the request API 204 may also prevent the third party application 202 from issuing another request to run in the background state, thereby preventing the third party application 202 from continually performing the request and becoming a nuisance to the user.

Illustrative Interfaces

Figure 6:
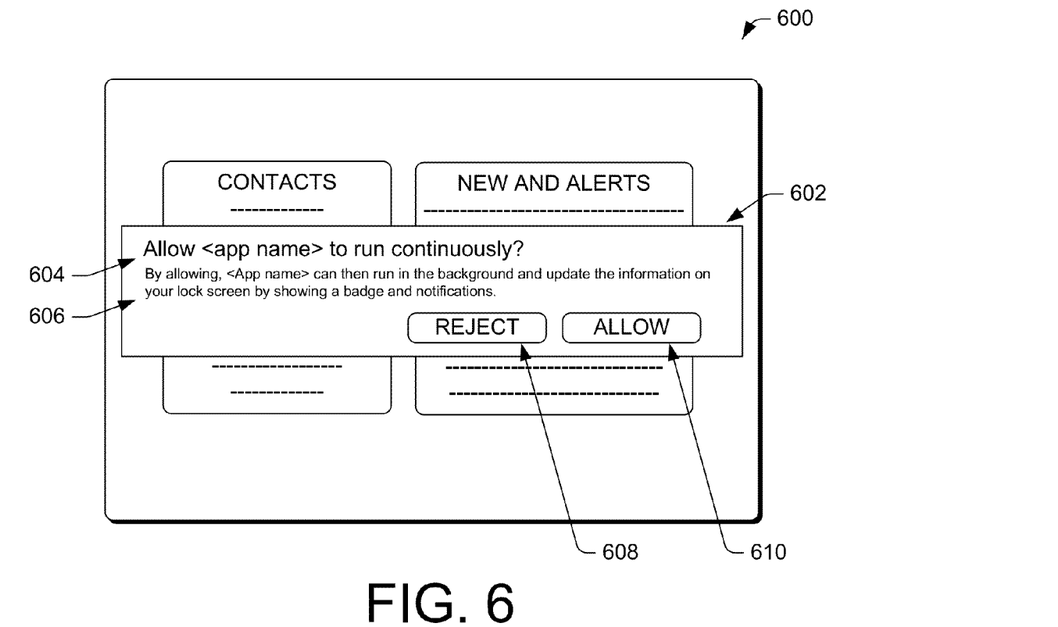
FIG. 6 is an illustrative user interface (UI) that informs a user that an application is requesting to run in the background.

FIG. 6 is an illustrative UI 600 that informs a user that an application is requesting to run in the background. The UI 600 may be generated in response to an operation performed by the consent module 206. For example, when the user installs a new application, the request API 204 may interact with the new application during or after the installation process, such as when the application is being configured for execution by the operating system 108. The consent module 206 may generate a message 602 to ask the user whether the user desires to allow the application to run continuously or otherwise ask whether the user will allow the application to run in the background state. In some instances, the consent module 206 may use layman terminology in the message 602 to help the user manage the permissions without becoming overwhelmed with technical information or complicated decisions. The message may include a question 604, a description 606, a "reject" command 608 and an "allow" command 610, among other possible commands. By selecting the "allow" command 610, the user may initiate the decision of "yes" from the allow permission decision operation 410 or 506. By selecting the "reject" command 608, the user may initiate the decision of "no" from the allow permission decision operation 410 or 506.

Figure 7:
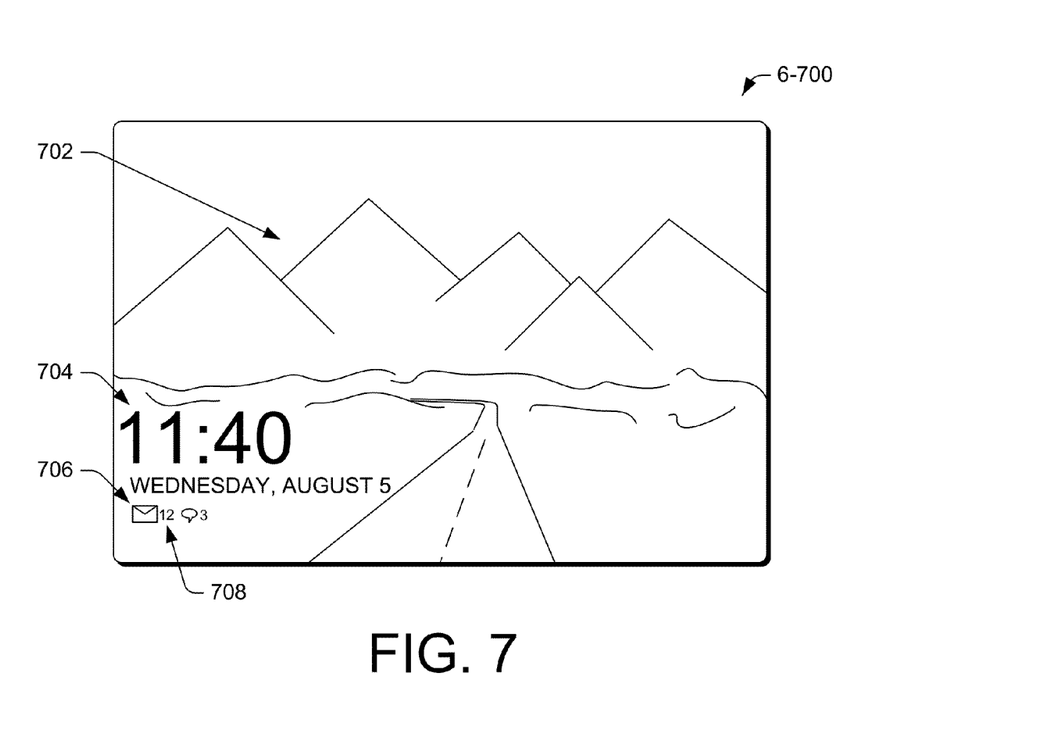
FIG. 7 is an illustrative UI that shows a lock screen having badges that represent applications that have permission to run in the background.

FIG. 7 is an illustrative UI 700 that shows a lock screen having badges that represent applications that have permission to run in the background. The UI 700 may include background imagery 702 and default information 704, such as a current time, a date, and/or other general information. The UI 700 may also include badges 706 that are representative of background applications 118, which are applications that have the permission to operate in the background state. In some instances, the badges 706 may include status information 708, which may indicate a missed message, a missed call, a quantity of messages, a temperature, and/or other relevant data provided by the background application having one of the badges 706. The badges 706 may be used to remind the user that the associated application is running in the background state and thus is consuming resources of the computing device 102, such as processing power and battery power.

Figure 8:
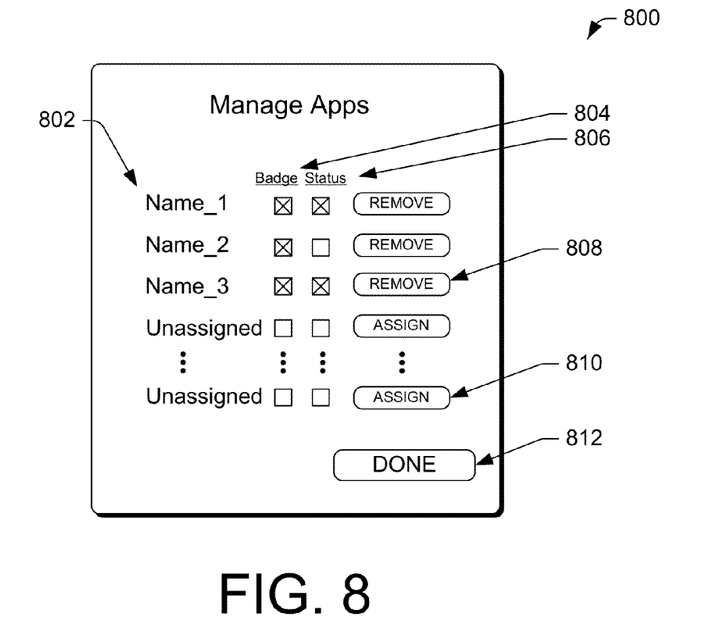
FIG. 8 is an illustrative UI that allows a user to manage permissions for applications that can run in the background.

FIG. 8 is an illustrative UI 800 that allows a user to manage permissions for applications that can run in the background. The UI 800 may be presented to a user by the consent module 206. For example, the consent module 206 may provide the UI 800 to the user following a user selection from a control panel, system preferences, or other similar collection of options generally associated with the operating system 108.

The UI 800 may include a list of the permissions 802. Some of the permissions may be assigned, and thus include the name of the background application 118 while others may be unassigned. A badge selector 804 may allow the user to select or deselect a permission for the background application to present the badge 706 as shown in FIG. 7. A status selector 806 may allow the user to select or deselect a permission for the background application to present the status information 708 with the badge 706 as shown in FIG. 7. A "remove" command 808 may enable the user to remove or rescind the permission for a background application, which may allow the user to then reassign the permission to another application. As discussed above, the number of permissions may be limited to a predetermined quantity, and thus removal and reassignment may be desirable when the user later decides to reassign or remove a permission. An "assign" command 810 may allow a user to assign the permission to an application. A "done" command 812 may save changes and close the UI 800.

Figure 9:
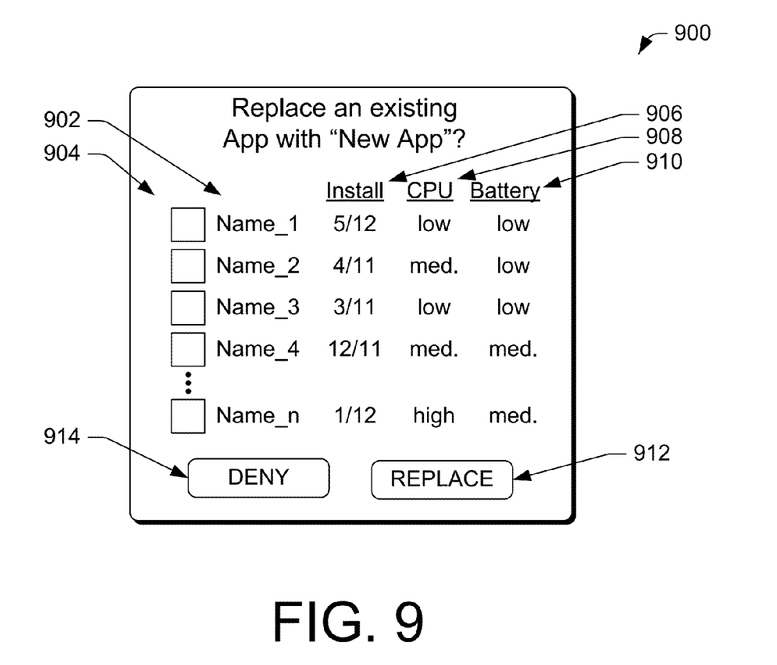
FIG. 9 is an illustrative UI that allows a user to replace a permission for an application when the threshold quantity of permissions has been reached or exceeded.

FIG. 9 is an illustrative UI 900 that allows a user to replace a permission for an application when the threshold quantity of permissions has been reached. The UI 900 may be generated in response to an operation performed by the consent module 206, such as the operations 516 and 518 shown and described with reference to FIG. 5.

The UI 900 may include a name 902 of an existing background application (e.g., the background applications 118) and a selector 904 to select the existing background application for replacement to revoke the permission and then assign the permission to the new application. The UI 900 may also include some metrics about the existing background applications, which may help a user decide which application to replace. The metrics may include an install date 906, a processor usage indicator 908, a battery usage indicator 910, and/or other metrics. The date provided by the processor usage indicator 908 and the battery usage indicator 910 may be conveyed in lay terms, such as low, medium, high; using a simple score (e.g., 1-5); using symbols; etc. Thus, the UI 900 may refrain from displaying technical information in the UI 900.

The UI may include a "replace" command 912 to replace a selected one (via the selector 904) of the existing background applications for replacement by the new application. A "deny" command 914 may reject the replacement any of the existing background applications, and thus may follow the "no" route from the decision operation 512 shown and discussed with reference to FIG. 5.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
   receiving, by an operating system executed by one or more processors, a request for an application to run in a background state;
   determining a quantity of applications that have permission to run in the background state;

determining whether the quantity of applications is less than a predetermined threshold number of applications that have permission to run in the background state;

in response to determining that the quantity of applications is less than the predetermined threshold number, permitting the application to run in the background state following receipt of a user approval of the request;

in response to determining that the quantity of applications is greater than or equal to the predetermined threshold number, providing an option to reassign a permission that was granted to another application, the option enabling receipt of the user approval of the request; and preventing the application from running in the background state after receipt of a user rejection of the request.

2. The method as recited in claim 1, wherein the predetermined threshold number of applications that have permission to run in the background state is a fixed quantity that is not modifiable by a user.

3. The method as recited in claim 1, wherein the option is provided by a user interface that presents current applications having permission to run in the background state.

4. The method as recited in claim 3, wherein the user interface shows at least one attribute of the current applications having the permission to run in the background state.

5. The method as recited in claim 1, further comprising creating a badge for the application following the user approval of the request, the badge being presented to a user in a user interface that tracks allocation of permissions for applications to run in the background state.

6. The method as recited in claim 5, further comprising presenting the badge in the user interface, the user interface being a lock screen.

7. The method as recited in claim 5, wherein the badge includes at least one notification generated by the application.

8. The method as recited in claim 1, wherein the predetermined threshold number of applications that have permission to run in the background state is based at least in part on user input.

9. The method as recited in claim 1, further comprising logging the application in a permissions log following the user approval of the request.

10. The method as recited in claim 1, further comprising preventing the application from issuing another request following the user rejection of the request.

11. A system comprising:
one or more processors;
memory;
a permissions log, stored in the memory, to track allocation of permissions for applications to run in a background state by an operating system;
a request application program interface (API), stored in the memory and executable by the one or more processors, to initiate a request for a permission on behalf of an application that requests to execute in the background state;
a consent module, stored in the memory and executable by the one or more processors, to receive user input to allocate available permissions in the permissions log, the consent module being called by the request API to enable the user input, wherein the consent module reassigns a permission from one of the applications to another of the applications based on the user input; and
a background execution manager, stored in the memory and executable by the one or more processors, to enforce the permissions log, wherein the background execution manager creates a badge for applications that are included in the permissions log.

12. The system as recited in claim 11, wherein the permission log limits the number of permissions to a predetermined number of permissions.

13. The system as recited in claim 11, wherein the badge is presented to a user in a user interface that tracks allocation of permissions for applications to run in the background state.

14. The system as recited in claim 11, wherein the background execution manager prevents applications that are not included in the permissions log from executing in the background state.

15. One or more computer storage devices storing computer-executable instructions that, when executed on one or more processors, causes the one or more processors to perform acts comprising:
receiving a request for an application to run in a background state;
determining whether a permission is available for allocation to the application;
in response to determining that the permission is available, permitting the application to run in the background state following receipt of a user approval of the request; and
in response to determining that the permission is not available, providing an option to reassign an issued permission that was granted to another application, the option enabling receipt of the user approval of the request; and
preventing the application from running in the background state after receipt of a user rejection of the request.

16. The one or more computer storage devices as recited in claim 15, wherein the determining whether the permission is available for allocation to the application includes determining whether a threshold number of permissions have been issued to other applications.

17. The one or more computer storage devices as recited in claim 15, further comprising preventing the application from issuing another request following the user rejection of the request.

18. The one or more computer storage devices as recited in claim 15, further comprising:
creating a badge for the application following the user approval of the request; and
presenting the badge to a user in a user interface that indicates at least some applications that are permitted to run in the background state.

19. The one or more computer storage devices as recited in claim 18 wherein the badge includes at least one notification generated by the application.

* * * * *